United States Patent [19]

Miller

[11] 4,032,272
[45] June 28, 1977

[54] WINDSHIELD REPAIR DEVICE

[76] Inventor: Richard E. W. Miller, 3216 NE. 13 St., Apt. 7, Pompano Beach, Fla. 33062

[22] Filed: June 16, 1976

[21] Appl. No.: 696,719

[52] U.S. Cl. .................. 425/12; 425/13; 425/405 R; 264/36; 156/94
[51] Int. Cl.² ............. B32B 35/00; B29F 5/00
[58] Field of Search ............. 425/11, 12, 13, 14, 425/405 R; 264/23, 36; 156/94

[56] References Cited
UNITED STATES PATENTS

| | | | |
|---|---|---|---|
| 1,926,415 | 9/1933 | Wertz | 425/13 |
| 2,524,419 | 10/1950 | Billner | 264/36 |
| 2,837,767 | 6/1958 | MacDonald | 425/13 |
| 3,562,366 | 2/1971 | Sohl | 264/23 |
| 3,765,975 | 10/1973 | Hollingsworth | 156/94 |
| 3,841,932 | 10/1974 | Forler et al. | 264/36 X |
| 3,914,145 | 10/1975 | Forler et al. | 425/12 X |
| 3,988,400 | 10/1976 | Lukman | 264/36 |
| 3,993,520 | 11/1976 | Werner et al. | 264/36 X |

*Primary Examiner*—J. Howard Flint, Jr.
*Attorney, Agent, or Firm*—Charles F. Gunderson

[57] ABSTRACT

Devices for covering up the effect of a pockmark in the outer layer of a safety glass windshield or the like include means for evacuating the atmosphere around the pockmark; sealing off the immediate area surrounding the pockmark; applying a highly-penetrating transparent liquid under pressure to the sealed area to force the liquid to penetrate the crevices of the fracture surrounding the pockmark. The transparent liquid fills the microscopic crevices surrounding the pockmark and then is hardened to make the pockmark permanently transparent and effectively invisible as one looks through the safety glass.

11 Claims, 6 Drawing Figures

U.S. Patent    June 28, 1977    4,032,272
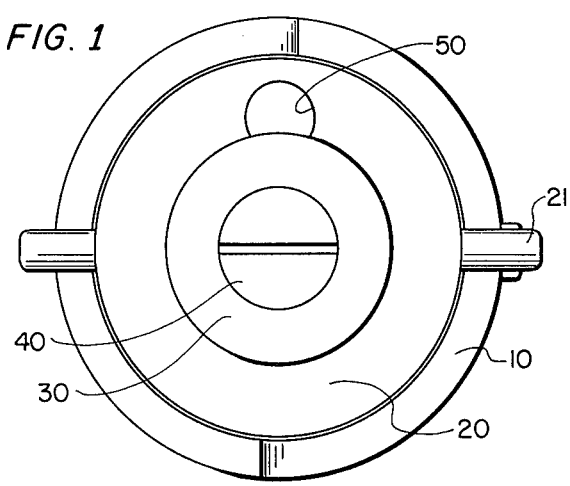
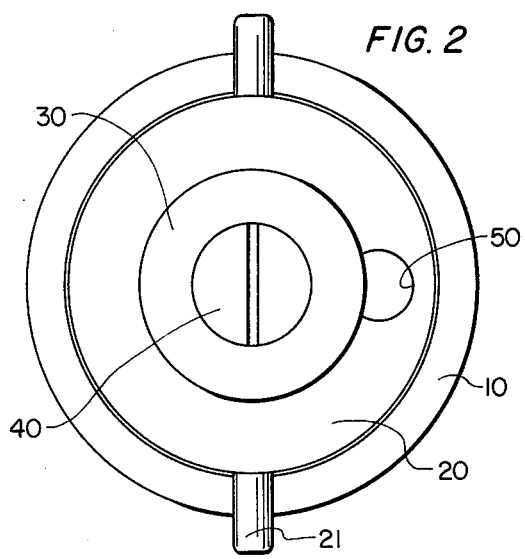
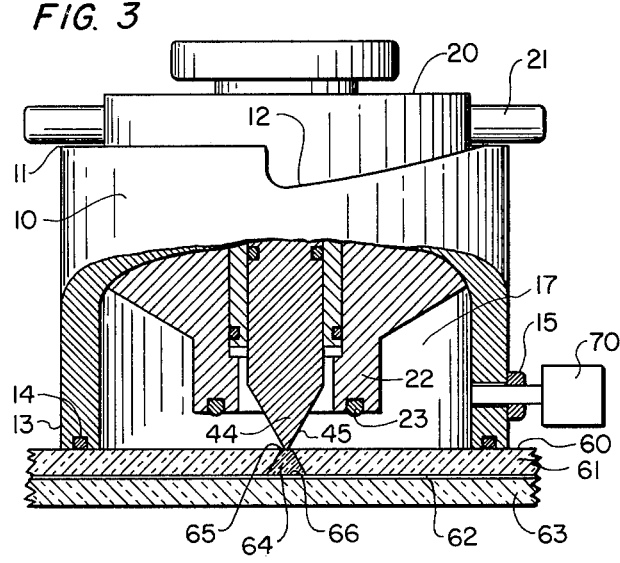
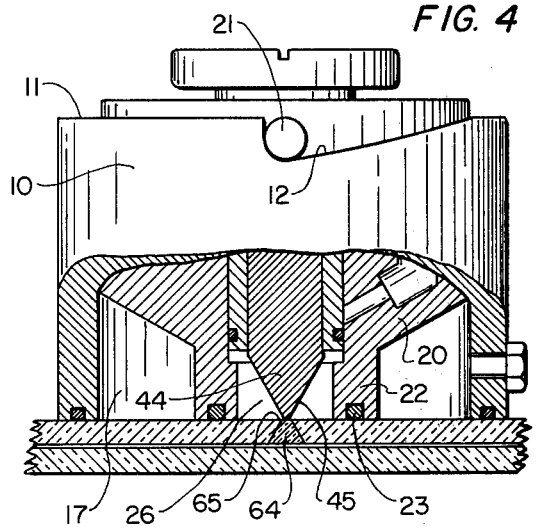
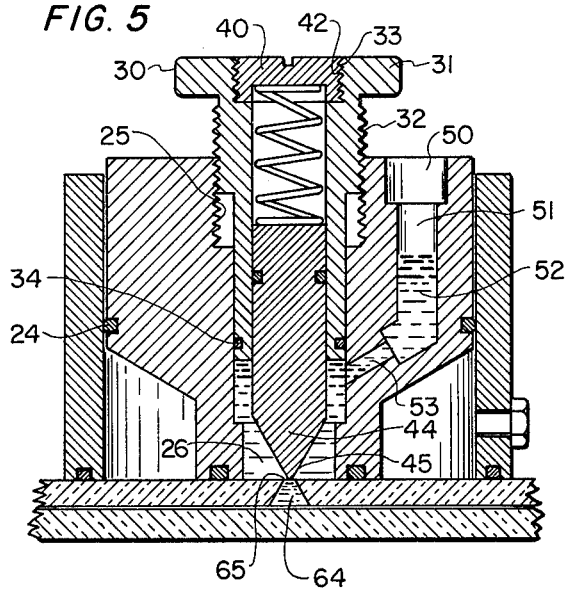
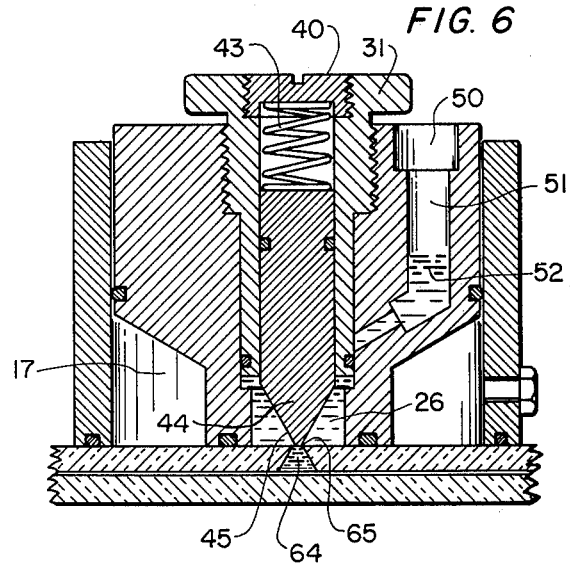

WINDSHIELD REPAIR DEVICE

BACKGROUND OF THE INVENTION

One of the many hazards of operating a motor vehicle is the probability of its windshield being hit by a stone or other small, hard object. Thanks to the safety glass, that is mandatory, the windshield usually withstands the shock of the hit, but quite often the outer layer of the safety glass is permanently pockmarked. The usual form of such a pockmark is a conical fracture with its apex at the surface where it was hit, and its base on the intermediate, resilient layer between the two layers of glass. This pockmark does not change the shape or decrease the strength of the safety glass, or limit its function as a windshield, but it is immediately apparent, visually, since the microscopic crevices or fissures between the newly-formed conical fracture and the rest of the outer glass layer provide reflecting surfaces that catch the light and distort images to make a virtual blind spot in the windshield at the fracture.

If such a pockmark or fracture is anywhere in the essential viewing area of the driver of the vehicle, it may be considered to be a safety hazard and the vehicle will not pass inspection. This would require a replacement of the windshield, which can be quite expensive, particularly with the modern cars whose windshield have become larger, more curved and more complex. Many, if not most, of the windshields in use today, would cost several hundred dollars, so there is a very real need for some inexpensive way of repairing or neutralizing the effects of a pockmark.

Aside from enlarging the pockmark to remove the conical fracture and then filling the void with a transparent plastic of some kind, the only way of eliminating the effect of the reflecting surfaces is to fill the microscopic crevices or fissures with a transparent liquid that eliminates the reflecting characteristics of the sides of the fissure. If the liquid is selfhardening or can be hardened by heat or ultraviolet light, or the like, for example, and the surface of the glass at the pockmark is leveled and polished, the pockmark becomes virtually invisible, and is effectively cured.

A few methods have been devised for trying to get the various liquids that are available into the crevices of the pockmark. Basically, these methods apply the liquid to the surface of the windshield surrounding the pockmark, and then try to get the liquid to work its way into the crevices. One method uses a pointed tool to depress the conical fracture microscopically into the resilient layer between the two layers of glass so that the liquid can flow into the enlarged crevices. Another method uses a pointed tool to depress the conical fracture and provides an enclosed container to hold the liquid in contact with the area surrounding the pockmark, while a high frequency vibration is applied to accelerate the flow of the liquid into the crevices.

Still another method uses a combination of heat and pressure along with a pointed tool. After preparation of the glass, the liquid is held in a container against the pockmark and pressure on the liquid is alternately increased and decreased until the liquid appears to penetrate the crevices. This may involve pressure and vacuum cycles that are alternated until the air trapped in the crevices of the pockmark appears to be released, and the crevices appear to be filled.

While most of these methods teach the use of a sharp pointed tool or probe to displace the conical fracture, it should be noted that, in most cases, the probe is forced in by a screw with no control of the force on the point, It would be hard for the operator to know whether the pressure was insufficient or great enough to further damage the glass.

These methods and their corresponding apparatus may be effective for a reasonable percentage of the time and percentage of cases, however, the simpler of the methods provides no means for the removal of trapped air, and the more complex methods may or may not remove trapped air from the crevices. In any case, the more complex methods require relatively complex auxiliary equipment, including bracing structures to hold the apparatus against the windshield, and complex and prolonged cycles of treatment.

It is therefore an object of this invention to provide a device, for sealing pockmarks in a windshield, that requires a minimum of equipment; that takes a minimum of time; that does not need an external bracing system; that does not require a succession of pressure changes nor heat cycles; that does not require extensive vibration; and that provides a constant, controlled pressure on the apex of the conical fracture during the operation.

SUMMARY OF THE INVENTION

A device for elimination of the visual effects of pockmarks in a safety-glass windshield has an outer, cylindrical sleeve with a slideable, closely-fitted intermediate assembly free to move in and out of the outer sleeve. The outer sleeve has a lower rim gasketed to provide an air tight contact with the windshield. The intermediate assembly has a lower tubular portion that is also gasketed to surround and seal the immediate area of the pockmark. A pressure assembly is positioned within the intermediate assembly to move a pointed plunger in and out of contact with the apex of a conical fracture and to open and close a port that releases a liquid to the area of the pockmark.

The outer sleeve cavity is first evacuated with the lower tubular portion of the intermediate assembly away from the postmark. Then the intermediate assembly is lowered until its gasketed, lower tubular portion engages the surface of the windshield surrounding the pockmark, sealing off this evacuated portion of the surface of the windshield next to the pockmark with the sharp point of the plunger applying pressure to the apex of the conical fracture.

The pressure assembly is then raised to open the port connected to the fluid reservoir to let the fluid flow into the cavity surrounding the pockmark fracture. The pressure assembly is then lowered to cut off the source of fluid, and further forced down to apply pressure to the confined fluid and to force the fluid into the crevices surrounding the conical fracture. When the crevices of the fracture are filled and the apparatus is removed and the liquid is hardened, the surface of the windshield is leveled and polished until the pockmark is no longer visible.

BRIEF DESCRIPTION OF THE DRAWINGS

FIG. 1 shows a top view of the device in its preliminary stage.

FIG. 2 shows a top view of the device in its secondary stage.

FIG. 3 shows a partial cross section of the device in its preliminary stage.

FIG. 4 shows a partial cross section of the device in its secondary stage.

FIG. 5 shows a cross section of the device in its third stage, and

FIG. 6 shows a cross section of the device in its fourth stage.

DESCRIPTION OF THE PREFERRED EMBODIMENT

Referring now more particularly to FIG. 1, a top view of this device is shown in its preliminary stage. An outer sleeve 10 is seen surrounding an intermediate assembly 20, which includes lugs 21, a pressure assembly 30, and a plunger assembly 40, as well as the fluid reservoir 50.

FIG. 2 shows another top view of the same device with the lugs 21 of the intermediate assembly rotated to the second stage, and the same elements similarly numbered.

FIG. 3 shows a partial cross section of the device in the first stage of figure one with similar elements similarly numbered. The outer sleeve 10 is seen to have an upper rim 11 with a sloping portion 12, and a lower rim 13 with a gasket 14 engaging a surface 60 of a safety glass windshield. In figure 3 the lugs 21 of the intermediate assembly 20 are seen to rest on the upper rim 11 of the outer sleeve. This holds a lower tubular portion 22 and its gasket 23 above the surface 60 of the safety glass. A plunger 44 is seen with its point 45 pressing against the apex 65 of a conical fracture 64 in the outer layer 61 of safety glass. A vacuum connection 15 is also seen coupled to a vacuum pump 70.

FIG. 4 shows another partial cross section of the device with the lugs 21 of the intermediate assembly at the base of the slope 12 along the upper rim of the outer sleeve and the lower tubular portion 22 and the gasket 23 of the intermediate assembly seated tightly around the apex 65 of the conical fracture 64. In this figure, the point 45 of the plunger 44 still engages the apex of the conical fracture.

FIG. 5 shows a complete cross section of the device to more clearly illustrate the pressure assembly 30, with its head 31, a first threaded portion 32 to engage a threaded portion 25 of the intermediate assembly; a second threaded portion 33 to receive a threaded portion 42 of the cap of the plunger assembly 40, and the gasket 34 between the pressure assembly and the intermediate assembly. In figure 5 the pressure assembly has been unscrewed to draw the assembly up above the outlet or port 53 of the reservoir 51. This causes the liquid 52 to flow into the cavity 26, adjacent to the pockmark. However, the plunger 44 may be left with its point 45 in contact with the apex of the conical fracture to encourage the flow of liquid into the crevices.

FIG. 6 shows another complete cross section, similarly numbered, of the device in its final stage with the pressure assembly screwed down to continue the pressure of point 45 on the apex 65 of the conical fracture 64 and to apply pressure on the liquid in the cavity 26. This will insure penetration of the liquid throughout the evacuated crevices.

The vacuum pump 70 has been omitted from FIGS. 4, 5 and 6 for clarity.

In operation the device is positioned on the surface of the safety glass 60 with the point 45 of the plunger 44 carefully lined up above the apex 65 of the conical fracture 64.

The lower rim 13 and gasket 14 are carefully seated on the surface 60 of the safety glass. The vacuum pump 70 evacuates the cavity 17 through the vacuum connection 15. The vacuum seats the gasket 14 and secures the device firmly to the surface of the glass while drawing a high percentage of air molecules out of the crevices surrounding the conical fracture 64. The various other gaskets hold the vacuum against the various moving parts of the device. The point of the plunger, under pressure, may displace the conical fracture to facilitate evacuation. In some cases it may be desirable, or necessary, to warm the glass around the pockmark to soften the intermediate layer 62 to facilitate the displacement of the conical fracture for maximum effective evacuation of air and penetration of the liquid filler and sealer.

The lugs 21, resting on the upper rim of the outer sleeve, hold the intermediate assembly just above the surface 60 of the glass so that the full vacuum is applied to the conical fracture area.

When the cavity 17 is evacuated, the lugs 21 are rotated slowly from the position of FIG. 1 to the position of FIG. 2, down the sloping portion 12 to allow the vacuum to draw the intermediate assembly 20 to the position of FIG. 4. At this point the bottom gasket 23 is seated. Both of the cavities, 17 and 26, will retain their vacuum, but the two are now separated. The vacuum in the outer cavity 17 provides the force to hold the device against the glass for the whole operation, but the inner cavity 26 will be filled with liquid by the next operation. The point 45 of the plunger 44 may still be in contact with the apex 65 of the conical fracture 64.

In the next operation, seen in FIG. 5, the pressure assembly 30 is drawn up by turning the head 31, normally in a counterclockwise direction. This raises the body of the pressure assembly up above the outlet or port 53 of the liquid reservoir. The liquid then is drawn from the reservoir 51 to the cavity 26 by means of the vacuum, as well as by gravity. The vacuum will also begin to draw the liquid into the crevices around the conical fracture 64 which may still be displaced by the point of the plunger.

In the next operation, seen in FIG. 6, the pressure assembly is screwed down to shut off the reservoir and to apply pressure to the liquid in the cavity 26 to force the liquid into the crevices. The conical fractures 63 is still displaced by the point 45 of the plunger 44, which, with the pressure on the liquid, facilitates the flow of liquid into the crevices. When the crevices are effectively filled, and the pockmark appears to be cleared, the pressure assembly can be withdrawn enough to take the pressure off the conical fracture. The vacuum connection is then opened to neutralize the pressure in the cavity 17 and the device can be removed from the glass.

The transparent liquid may be cured after the device is removed, since the residue should be cleaned out of the device, or the device made ready for another operation. Enough of the liquid should be built up on top of the apex of the pockmark to allow for finishing and polishing.

After the liquid has set and hardened within and around the pockmark, the residue of transparent solid can be cleaned up and the surface of the glass leveled and polished to provide unobstructed vision through the pockmarked area of the windshield.

The vacuum pump can be of any conventional type. The higher the vacuum, the tighter the hold against the windshield and the better the evacuation of the crevices, obviously. However, any reasonable source of vacuum may be effective and adequate under normal or field conditions. It is intended that this device should be available to the amateur for home repairs as well as to the professional for his repairs under ideal conditions.

The liquid may be any of the available types that are thin enough to flow into the minute crevices before being hardened into a transparent solid. These liquids may be cured by exposure to heat, ultraviolet light, or other means in a well known manner. Some work better at higher temperatures, which can obviously be applied here to the glass, the device, and the liquid. It is assumed that improved liquids will become available as the state of the art advances.

The size and shape of the outer sleeve may be varied to vary the area under vacuum and the ultimate pressure holding the device against the glass, as well as to conform to the shape of the surface of the glass. The size and shape of the lower, tubular portion of the intermediate assembly, along with its gasket, can also be varied to conform to the shape of the glass.

The cavity 26 can also be reduced to reduce the loss of liquid, since only a very small amount of liquid will be needed to fill the crevices, and the liquid remaining in the cavity must be wasted. Similarly, the size and shape of the plunger assembly may be varied within practical limitations to reduce the volume of the cavity 26 for the final stage.

The reservoir 51 will presumably have a cap 50 of some kind to contain the liquid 52. However, this cap may be flexible to reduce counter-pressure on the liquid as it flows into the cavity 26, or it may be replaced by a plunger, not shown, that can be used to force the liquid into the cavity. This reservoir may also be replaced by a plastic container of a flexible type to feed, or even force, the necessary liquid into the reservoir or cavity 26. Other well known types of valves may be used to open and close the port 53.

The several gaskets are necessary to maintain the vacuum as well as to contain the liquid. They can be of any well known types that can conform to the appropriate surfaces, that are resistant to the chemicals being used in the liquid, and that can tolerate any degree of heat that may be applied.

The actual alignment of the device with the pockmark may be accomplished visually, or with guides or marks on the windshield. It is very critical, of course, and it is rather essential that the point of the plunger be in contact with the apex of the conical feature. One of the methods of aligning the device would be to drill a very small hole, or make a small dent of some kind, with a glass cutting bit, in the center of the fracture. The point of the plunger can then be seated in this hole, and the device held in this position until the vacuum seats the device firmly in position.

While the point of the plunger is shown in constant contact with the apex of the conical fracture in all the operation it will be apparent that this may not be essential for effective use of this device. The pointed probe may be used during the evacuation stage and during the filling stage when maximum access to the crevices may be desirable to the operation, but it may be omitted entirely when the vacuum is effective enough and the liquid is penetrating enough to fill the crevices without the help of the probe.

This would also be the case where fractures other than the basic conical type, illustrated here, are involved. The fracture may take the form of a star, for example, or other shape depending on the object striking the windshield and the angle of impact. Any fracture small enough to be evacuated by this device—or a relatively larger version—can be cured by this device.

The surface of the windshield may be substantially flat around the pockmark, or curved so slightly that simple gaskets can accommodate the curvature. However, for pockmarks in more highly curved areas, special gaskets, or specially formed outer sleeves, can, of course, be adapted to the necessary degree of curvature.

The sloping portion 12 of the upper rim 11 provides a means for raising and lowering the intermediate assembly as needed for evacuating and sealing the cavity 26 while the liquid is being applied. However, it will be obvious that other mechanisms of well known types may be used for this purpose. Similarly, other means may be used to control the pressure assembly and its plunger.

While a typical embodiment has been shown here to illustrate this invention, it is obvious that many variations and embodiments of this device are within the scope of this invention and will include all of the elements hereinafter claimed.

The plunger assembly is shown to have a slotted, threaded cap 40 holding the spring 43 that urges the plunger 44, with its point 45, against the apex of the conical feature. This spring provides a relatively-constant, controlled pressure and reduces the possibility of further damage to the glass by excessive pressure during the repair operation.

Having thus described my invention, what is claimed is:

1. A device for repairing a pockmark in a pane of safety glass with a transparent, low-viscosity, highly-penetrating, liquid sealant comprising means for sealing off a first given area of said safety glass around said pockmark; means for evacuating the sealed portion of said first given area; means for sealing off a second given area of said safety glass, around said pockmark, within first given area; means for applying said liquid sealant to the sealed portion of said second given area, to fill the voids in said pockmark; means for filling said sealed portion of said first given area with air to release said device from the surface of said safety glass; means for transforming said liquid sealant to a transparent solid material; and means for leveling and polishing said transparent solid material around said pockmark to render said pockmark invisible.

2. A device for repairing a pockmark in a pane of safety glass as in claim 1 wherein said liquid sealant is applied to said sealed portion of said second given area under pressure.

3. A device for repairing a pockmark in a pane of safety glass as in claim 1 including a pointed probe means, extending through said means for sealing off said second given area, for probing and dislodging any solid mass extending into said glass that might entrap air during the evacuation of said first given area and the applying of said liquid sealant to said second given area.

4. A device for repairing a pockmark in a pane of safety glass as in claim 1, wherein said pockmark comprises a conical fracture with an apex toward the outside of said safety glass, wherein said means for sealing off said first given area comprises an outer sleeve having an upper rim, and a lower rim for engaging the outside surface of said safety glass surrounding said pockmark; means for providing a vacuum seal between said lower rim and said glass; said means for sealing off said second given area comprises an intermediate assembly slideably positioned within said outer sleeve, said intermediate assembly having a centrally-located lower tubular portion; means for providing a vacuum seal between said intermediate assembly and said outer sleeve; means attached to said intermediate assembly for holding said lower tubular portion above said glass in a first position; means for evacuating the cavity between said outer sleeve and said glass while said intermediate assembly is in said first position; means for lowering said intermediate assembly to put said lower tubular portion in contact with said surface of said glass around said pockmark in a second position; means for providing a seal between said lower tubular portion and said glass; a pressure assembly, slideably positioned within said intermediate assembly; means for providing a vacuum seal between said pressure assembly and said intermediate assembly; a plunger, slideably positioned within said pressure assembly, said plunger having a lower pointed end for engaging said apex of said glass to displace said conical fracture; means for providing a vacuum seal between said plunger and said pressure assembly; means for moving said pressure assembly upwardly within said intermediate assembly to a first position away from said glass; means for putting said liquid sealant in the cavity within said intermediate assembly between said pressure assembly and said glass when said intermediate assembly is in said second position and said pressure assembly is in said first position; and means for moving said pressure assembly downwardly to a second position to compress said liquid sealant; spring means positioned between said pressure assembly and said plunger for urging said plunger downward against said apex to displace said conical fracture at all times whereby any air will be evacuated from and a portion of said liquid sealant will flow into the crevices between said conical fracture and the rest of said glass to make said conical fracture invisible, and means for solidifying said liquid sealant in said crevices of said pockmark.

5. A device for repairing a pockmark in a pane of safety glass as in claim 4 wherein said means for providing a vacuum seal between said lower rim and said glass comprises a gasket molded to conform to the shape of the surface of said glass around said pockmark.

6. A device fo repairing a pockmark in a pane of safety glass as in claim 4 wherein said means for providing a seal between said lower tubular portion and said glass comprises a gasket molded to conform to the shape of the surface of said glass adjacent to said pockmark.

7. A device as in claim 4 wherein said means for evacuating the cavity between outer sleeve and said glass comprises a vacuum connection through said outer sleeve; a vacuum pump; and means for connecting said vacuum pump to said vacuum connection.

8. A device as in claim 4 wherein said means attached to said intermediate assembly for holding said lower tubular portion above said glass in a first position comprises a pair of opposing lugs extending outwardly from said intermediate assembly and resting on said upper rim of said outer sleeve, and said means for lowering said intermediate assembly to put said lower tubular portion in contact with said surface of said glass around said pockmark in a second position comprises a pair of inclined planes on opposing sides of said upper rim of said outer sleeve, into which said opposing lugs can be rotated.

9. A device as in claim 4 wherein said means for moving said pressure assembly upwardly within said intermediate assembly to a first position away from said glass, and downwardly to a second position to compress said liquid sealant comprises a threaded portion of said pressure assembly that engages a corresponding threaded portion of said intermediate assembly, so that rotation of said pressure assembly within said intermediate assembly moves said pressure assembly in a corresponding direction.

10. A device as in claim 4 wherein said means for putting said liquid sealant in the cavity within said intermediate assembly between said pressure assembly and said glass when said intermediate assembly is in said second position comprises a reservoir in said intermediate assembly having a valve that is opened when said pressue assembly is in said first position, to release said liquid sealant, and closed when said pressure assembly is in said second position to seal said cavity.

11. A device as in claim 4 wherein said liquid sealant is a thermo plastic, and means are provided for applying heat to the area of said pockmark to harden said thermo plastic when said crevices of said pockmark are filled.

* * * * *